Figure 8:
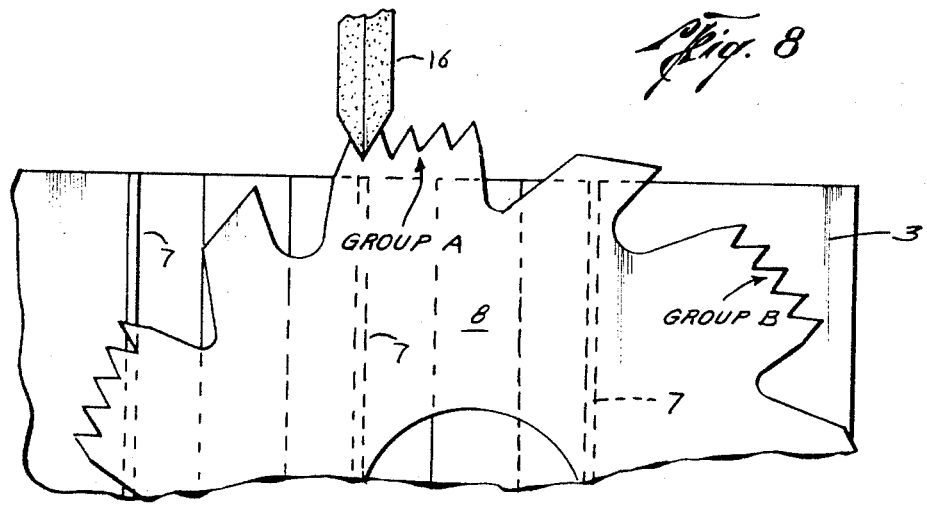

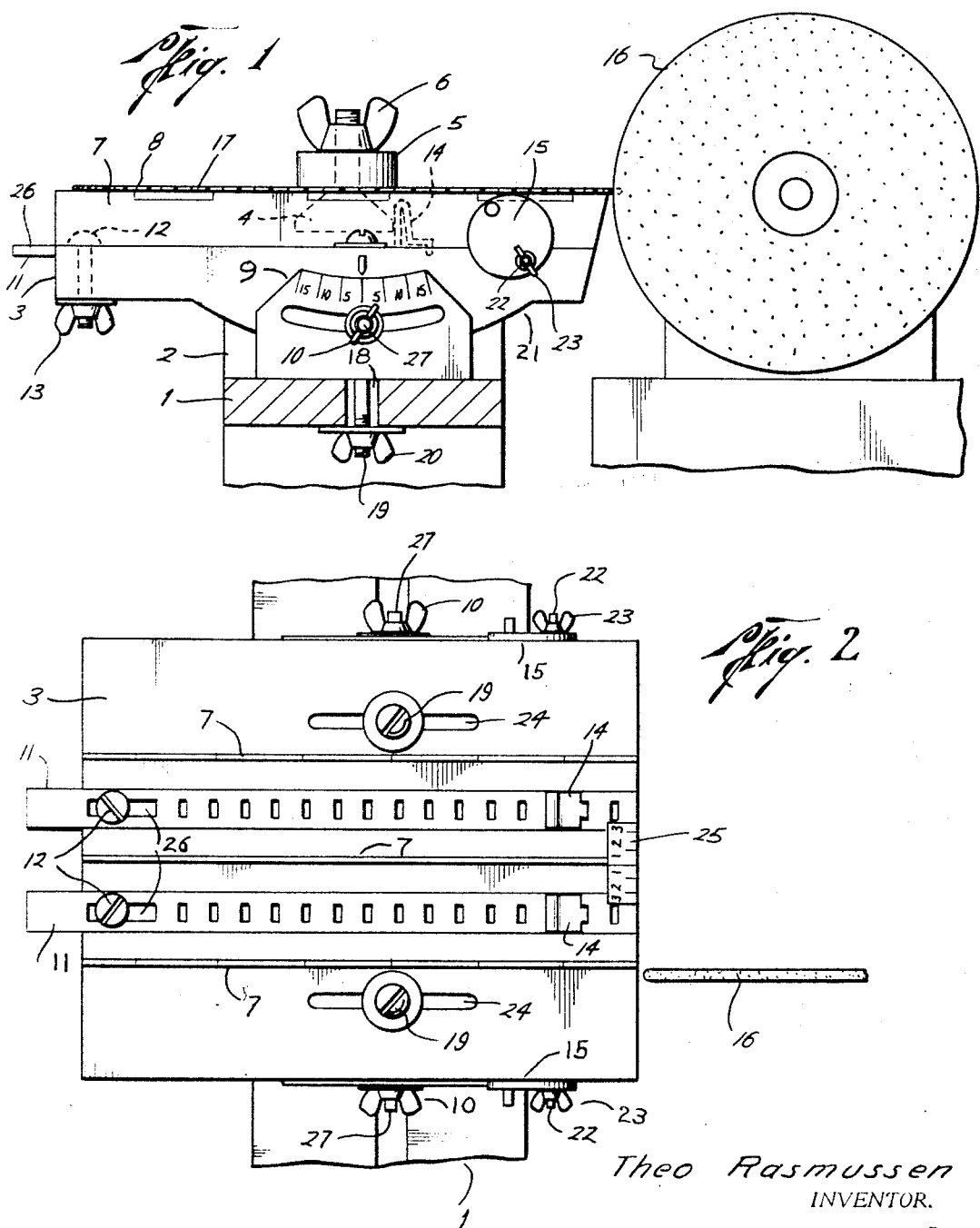

June 3, 1969     T. RASMUSSEN     3,447,401
CIRCULAR SAW SHARPENING APPARATUS
Filed Dec. 20, 1966     Sheet 2 of 4
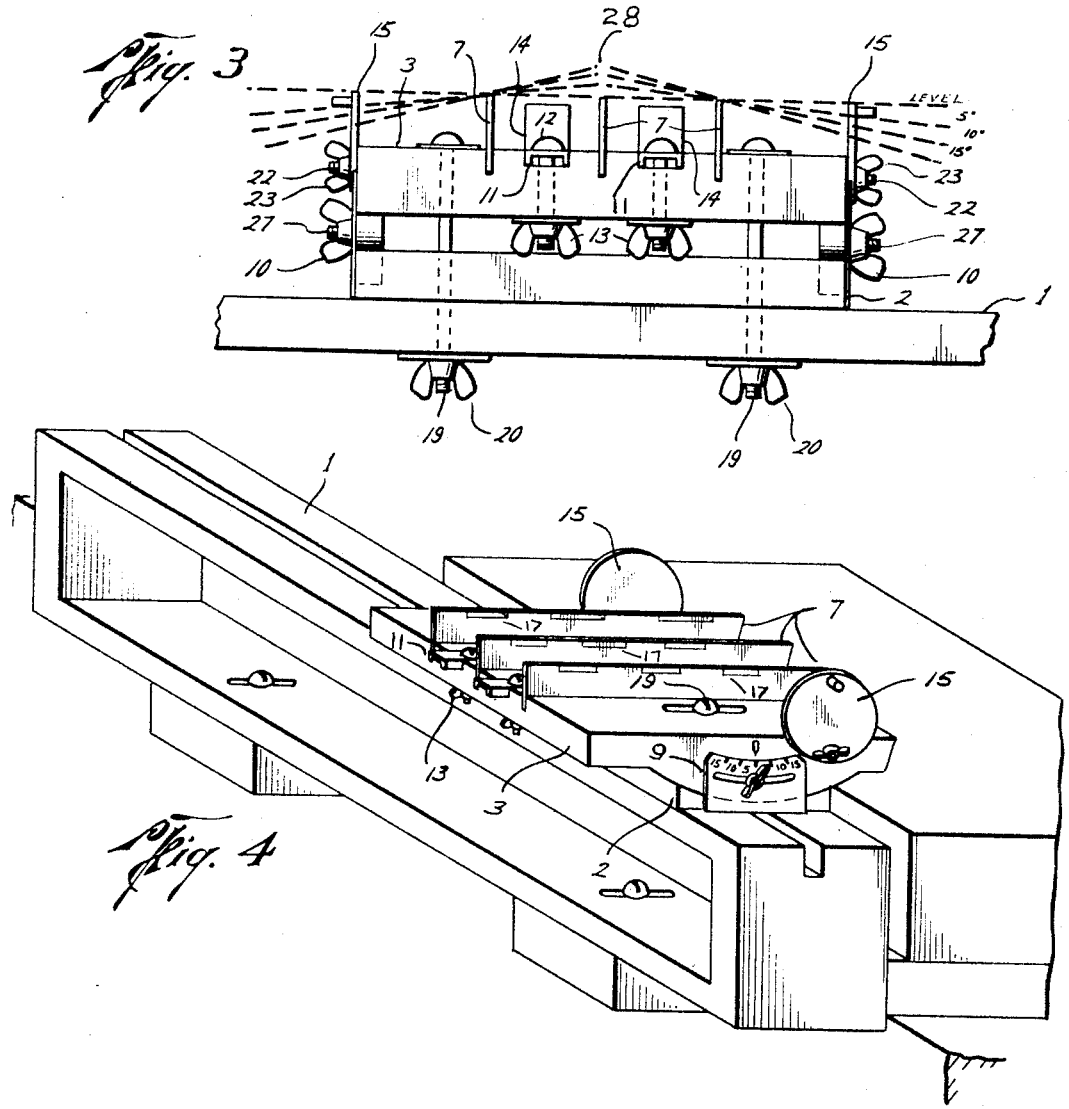
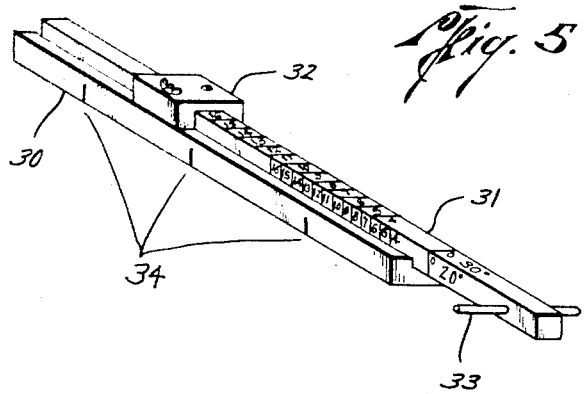
Theo Rasmussen
INVENTOR.
BY C. Ray Holbrook
ATTORNEY

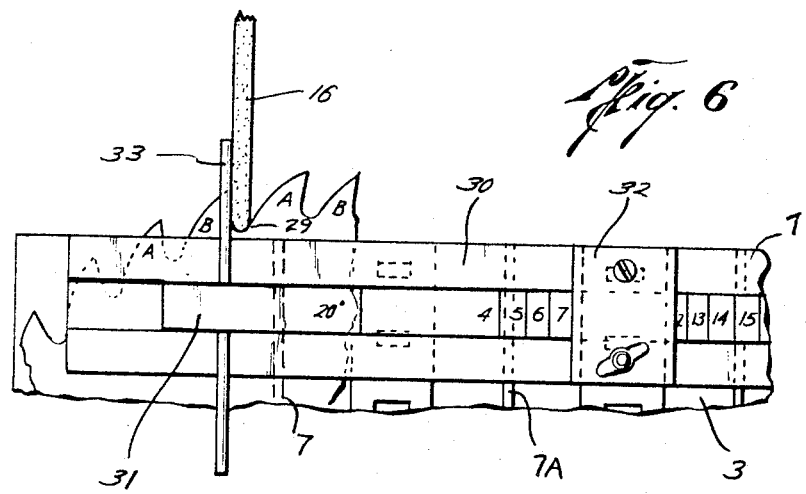
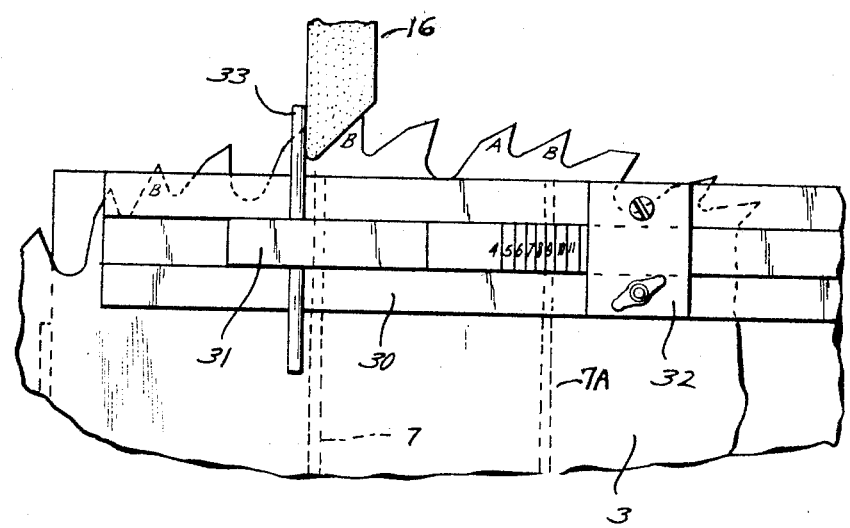

Theo Rasmussen
INVENTOR.

BY C. Ray Holbrook
ATTORNEY

United States Patent Office 3,447,401
Patented June 3, 1969

3,447,401
CIRCULAR SAW SHARPENING APPARATUS
Theo Rasmussen, 5217 Avenue P,
Galveston, Tex. 77550
Filed Dec. 20, 1966, Ser. No. 603,393
Int. Cl. B23d *63/12*
U.S. Cl. 76—43                                    5 Claims This invention relates to an improved apparatus for sharpening circular saws and more particularly to an apparatus for gumming, jointing and shaping of the teeth of circular saw blades, whether they be ripping saws, combination saws or dado saws. Even more particularly, this invention is related to an apparatus which can be used in an ordinary home-shop in conjunction with a grinding wheel to accurately and precisely gum, joint and shape the teeth of a circular saw blade during the sharpening process.

In home woodworking shops the major tool for amateur wood workers is an electric circular saw. These saws are used for a variety of purposes in a home woodworking shop with different saw blades provided for different uses. In the interest of economy many persons would like to grind, shape and sharpen their circular saw blades either for their own purposes or on a small economical scale for people in the neighborhood who do not wish or have the equipment to do their own circular saw blade sharpening. This is normally impossible because existing machines are much too expensive and require expertness inconsistent with an amateur craftsman, yet the quality of work which most amateur craftsmen desire cannot be provided unless the circular saw blades are expertly sharpened. However, nearly all persons own or have excess to an ordinary grinding wheel and together with the apparatus of the present invention can provide their own circular saw sharpening process which will give high quality sharpening at an inexpensive price.

Although many home circular saw sharpening devices which are available from mail order houses and large department stores are designed to successfully grind the face or leading edge of the teeth of a circular saw blade, none of them are equipped to smoothly and accurately joint the saw teeth and gum the gullet of the saw teeth. In addition and of utmost importance, none of the existing devices are designed to bevel the saw teeth. If this is done at all it is done by hand using no apparatus other than the grinding wheel itself and the quality of the work performed is dependent wholly upon the skill and experience of the amateur craftsman. Thus, the height of the teeth is likely to be different from point to point, the bevel is not likely to be the same and consequently uneven wear and a great deal of vibration is normally experienced when using a circular saw blade prepared in this manner. Furthermore, when using some of the devices now on the market, one must have one hand on the saw blade and one hand on the grinding motor and the saw blade is very difficult to control.

It is therefore, an object of the present invention to provide an apparatus for jointing, gumming and shaping of the teeth of a circular saw blade, while sharpening said circular saw blade, which may be used by the amateur craftsman, thus avoiding the necessity of taking the saw to a specialist or commercial shop.

More specifically, it is an object of the present invention to provide an apparatus for gumming, jointing and shaping the teeth of a circular saw blade, an apparatus which may be manipulated by the user by hand to accurately and smoothly joint, gum and shape the saw teeth with the precise and proper angle of hook on the face of the saw teeth and the proper bevel on the saw teeth.

Yet another object of the present invention is to provide a circular saw blade holding device which may be manipulated with reference to the grinding wheel so that the face and the gullet of each saw tooth are accurately jointed and gummed and the saw teeth have the proper hook and bevel without depending upon the skill of the operator or an automatic sharpening machine.

Other objects and advantages of this invention will become apparent to those skilled in the art from the following description, drawing and appended claims.

Figure 9:
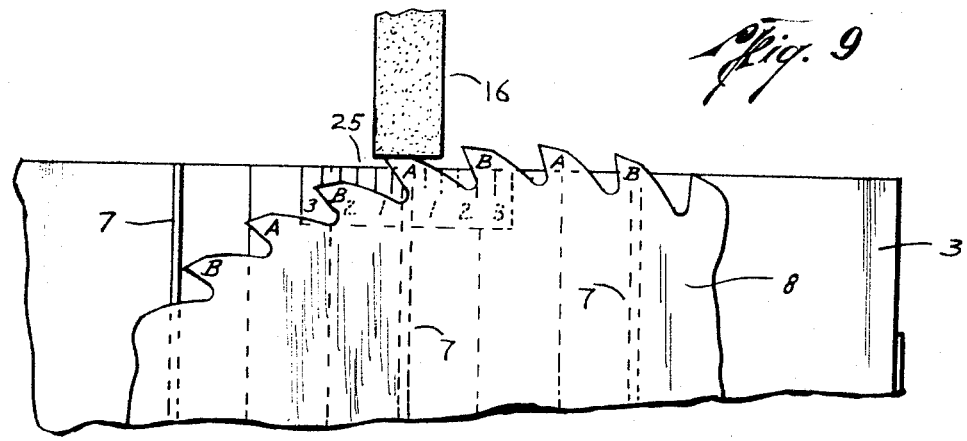
Figure 10:
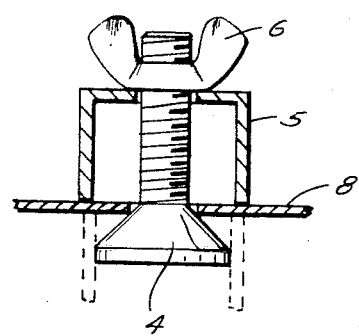

The accompanying drawings will illustrate the apparatus of this invention but are not to be construed as limiting it in any manner whatsoever. FIGURE 1 shows a side view of the apparatus of the present invention with all of the essential parts of the apparatus and shows the grinding wheel as it contacts the circular saw blade. FIGURE 2 is a top view of the apparatus showing the assembly of the various parts and the adjustments for the slides, but without the saw blade present. FIGURE 3 is a section through the apparatus accurately showing the slots where the saw blade and holder are moved forward and backward into the grinding wheel. FIGURE 4 is an isometric view of the apparatus showing all of the essential parts shown in more detail in FIGURES 1 through 3. FIGURE 5 is an isometric view of the hook gauge, a device essential to accurately and quickly set the hook for any size circular saw blade. FIGURE 9 is a top view of the apparatus showing the circular saw blade in proper position for jointing and beveling the top of the teeth of the circular saw blade against the square face of the grinding wheel. FIGURE 6 is likewise a top view of the apparatus of the present invention shown in the proper position for gumming the circular saw blade and showing the saw blade in contact with the narrow gumming wheel. FIGURE 7 is a top view of the apparatus of the present invention with a combination circular saw in place and in contact with a 45 degree grinding wheel for the proper sharpening and shaping of the cutting teeth of the combination saw. FIGURE 8 is likewise a top view of the apparatus of the present invention with a dado circular saw blade in place and in contact with the point of a 60 degree bevel grinding wheel for the proper sharpening and shaping of the cutting teeth of the dado saw. FIGURE 10 is an isometric view of the circular saw blade holder and the method devised for holding the blade tight on the holder.

Referring now to FIGURE 1, base plate 1 is fastened to the work bench or other means for supporting the grinding wheel and is designed only as a supporting base upon which the apparatus of the present invention can slide from side to side. Slide base 2 resides on top of base plate 1 and is held in the proper position for sliding sideways by key 18 which fits into a slot in base plate 1 to make a slidable connection between base plate 1 and slide base 2. Slide base 2 is held firmly at the proper position on base plate 1 by bolts 19 and wing nuts 20 which can be tightened at any place along the length of base plate 1. Quadrant 3 is connected to slide base 2 along the curvature of cradle 21 and is held firm at the desired position by wing nut 10 and bolt 27. The desired vertical angle at which quadrant 3 approaches grinding wheel 16 is determined by scale 9 which measures from 0 to 15 degrees positively or negatively the angle of quadrant 3 with the horizontal. Slide 7 is one of three metal strips inserted in slots in quadrant 3 and are the means by which circular saw blade 8 is guided into grinding wheel 16. Slides 7, three in number, are designed to support circular saw blade 8 as it engages grinding wheel 16. To properly guide circular saw blade 8 into grinding wheel 16, holder 4 is clamped on to circular saw blade 8 by means of washer 5 and wing nut 6. Holder 4 is designed to slide between two of the three slides 7 so that circular saw blade 8 is guided towards grinding wheel 16 with complete accuracy. To maintain the identical depth for each gullet of each saw tooth of circular saw blade 8 by grinding wheel 16, stop 14 is inserted into bracket 11 which may be adjusted back and forth towards the grinding wheel by loosening wing nut 13 on bolt 12 so that bracket 11 can slide along slot 26 (see FIGURE 2). Eccentric wheel 15 may be rotated and tightened on bolt 22 by wing nut 23 to provide a support for the perimeter of circular saw blade 8 as it engages grinding wheel 16.

Referring now to FIGURE 2 which is a top or plan view of the apparatus of the present invention, quadrant 3 is shown with all of the various other accouterments attached thereto except circular saw blade 8 and holder 4, which are omitted. Slides 7, three in number, are shown in their respective slots in position to support circular saw blade 8 in position for grinding. Please note that on middle slide 7, guide 25 is provided as a measuring device to determine the desired bevel to be ground on the top of the teeth of circular saw blade 8. Brackets 11, two in number, are provided solely to permit stop 14 in each bracket 11 to be located with as much flexibility and as many various positions as possible. In addition to the number of holes in which stop 14 might be anchored in brackets 11, there is also provided bolt 12 with a wing nut (not shown) on the bottom of each bolt to tighten bracket 11 in slot 26 at the desired location. Bolts 19, one on each side of quadrant 3, are shown in their appropriate locations to anchor quadrant 3 onto base plate 1, and slot 24 is provided for easy movement of bolt 19 as quadrant 3 is adjusted at the desired vertical angle as measured on scale 9. Wing nut 10 is provided ot tighten on bolt 27 to anchor quadrant 3 on slide base 2. Eccentric wheel 15 is shown on each side of quadrant 3 with bolt 22 and wing nut 23 to tighten eccentric wheel 15 at the desired height. As noted previously, eccentric wheel 15 provides stability and support for the perimeter of circular saw blade 8 (not shown), when it engages grinding wheel 16.

Referring now to FIGURE 3 the apparatus of the present invention is shown in section to more clearly show several essential features of the invention. In addition to the various other parts in FIGURE 3 which have been described in FIGURES 1 and 2, the items depicted most definitely in FIGURE 3 are slides 7 inserted in quadrant 3, eccentric wheel 15, stops 14, and brackets 11. Middle slide 7 may be replaced with a higher slide 7A so that it might reach as high as apex 28. Circular saw blade 8, not shown in FIGURE 3, would then be supported by middle slide 7A and one of the other of slides 7 and eccentric wheel 15 adjusted downward for as much as 15 degrees as shown in FIGURE 3. By this means the teeth on circular saw blade 8 might have as much as a 15 degree bevel on the face or leading edge of each saw tooth.

FIGURE 4, an isometric view of the apparatus of the present invention, will clarify any questions as to the construction of the apparatus not already adequately answered in FIGURES 1, 2 and 3. Slide base 2 rests on base plate 1 which is appropriately slotted to provide for motion sideways and none forward or backwards. Quadrant 3 is held in place on slide base 2 by tightening wing nut 10 on bolt 27 adjusting the angle with the horizontal of quadrant 3 using scale 9. Eccentric wheels 15, slides 7, brackets 11 and the various bolts and wing nuts to tighten the named items are all depicted in their respective location on the apparatus of this invention.

On FIGURE 5 the details of the hook gauge are shown. Marked member 31 is slidably slotted into base 30 and may be fixed in the desired position by tightening the wing nut on block 32. Pointer 33 is used to set the distance of quadrant 3 in FIGURES 1-4 the proper distance from the grinding wheel as more fully explained in the description of FIGURES 6 and 7. Slots 34 are prepared to fit on slides 7 in FIGURES 1-4. Marked member 31 has thereon saw diameter marks on each of three sides for a 10 degree hook, a 20 degree hook and a 30 degree hook respectively. For instance, using the 20 degree hook side and a 7 inch diameter saw blade, set marked member 31 on base 30 so that 7 just barely shows from under block 32 and tighten the wing nut in that position. The hook gauge will be used with this setting in FIGURE 6.

As an example in the operation of the apparatus of the present invention to sharpen, joint, gum and shape the teeth of a circular saw blade and referring first to FIGURE 10, circular saw blade 8 is firmly clamped onto holder 4 by washer 5 and wing nut 6, and placed on quadrant 3 as described in FIGURES 6-9.

Referring now to FIGURE 9 in the operation of the apparatus, quadrant 3 is set on slide base 2 and base plate 1 with scale 9 measurinng approximately two degrees up at grinding wheel 16 and with slides 7 all the same height. Middle slide 7 is then lined up against the middle of a one-half inch square face grinding wheel 16. Now using a seven inch diameter combination rip saw blade 8 with teeth A and B pointing to the left at the top of saw blade 8, holder 4 with saw blade 8 fastened thereto is placed on quadrant 3 with holder 4 going in the right hand track between middle slide 7 and right slide 7. The following procedure is suggested for optimum advantage using the apparatus of this invention: Move saw blade 8 up to grinding wheel 16 with the set in tooth A pointing up and line tooth point A with the ½ mark on the left side of guide 25 so tooth A is aligned with grinding wheel 16 for the correct and proper depth of grinding into the top of saw tooth A. Then set stop 14 against holder 4 and tighten wing nut 13 on bracket 11.

Next set stop 14 in left hand track parallel or straight across from stop 14 in the right hand track and tighten wing nut 13 on bracket 11. With stops 14 set in both tracks you are ready to grind, bevel and sharpen the top of teeth A and B on both sides of saw blade 8.

With saw blade 8 on slides 7 with holder 4 going in the right hand track of slides 7 as shown in FIGURE 6, rotate saw blade 8 to right with both hands for perfect control of blade, grinding every A tooth by moving saw blade 8 in and out to grinding wheel 16 as far as stop 14 will permit.

To grind the other side of the blade, the exact procedure is now repeated by turning saw blade 8 over in holder 4, placing saw blade 8 down on slides 7 and with holder 4 going in the left hand track between middle slide 7 and left hand slide 7 and then grinding every B tooth with the point of B tooth at mark ½ on the right side of guide 25. When this is completed every saw tooth A and B of circular saw blade 8 is accurately ground, jointed and sharpened on the point with a two degree bevel on the point of each saw tooth.

Now using a ⅛ inch gumming wheel 16 and referring to FIGURE 6 for gumming, beveling and shaping the saw teeth and with scale 9 set to 0, place the hook gauge shown in FIGURE 5 on slides 7. Set marked member 31 to 7 inches on the 20 degree scale. Move quadrant 3 so pointer 33 touches the left side of gumming wheel 16. Tighten wing nut 20. Replace middle slide 7 with higher slide 7A so the angle of circular saw blade 8 with the horizontal is 10 degrees.

Now with saw blade 8 in holder 4 and saw teeth A and B pointing to the right at the top of the saw blade, and with holder 4 going in the left hand track of quadrant 3 between middle slide 7 and left hand slide 7, move saw blade 8 up to gumming wheel 16 with the set in B tooth pointing up and the face of B tooth against the left side of gumming wheel 16, grind gullet 29 for desired depth of cut ito saw blade 8. Set stop 14 against holder 4 and tighten wing nut 13 on bracket 11.

Set stop 14 in right hand track parallel or straight across from stop 14 in the left hand track and tighten wing nut 13 on bracket 11. With stops 14 set in both tracks, you are ready to bevel the face of teeth A and B and gullet 29 and shape the back of teeth A and B on both sides of saw blade 8. Place saw blade 8 on slides 7 with holder 4 going in the left hand track as in FIGURE 6. Rotate saw blade 8 to the left holding the saw blade with both hands for perfect control, moving blade in and out toward gumming wheel 16 to grind gullet 29.

This action grinds a bevel on the face of tooth B with the set pointing up. Then revolving saw blade slowly to left and coming out of gullet 29, shape the back of tooth A.

To grind the other side of the saw blade, the exact procedure is now repeated by turning saw blade 8 over in holder 4, turning the hook gauge end for end and using the right hand side of gumming wheel 16 and the right hand track between middle slide 7A and right side 7 to grind all A teeth. Combination rip saw blade 8 has been correctly and accurately jointed, sharpened, gummed and shaped with a 20 degree hook on the saw teeth, a 10 degree bevel on the face of the teeth and a 2 degree bevel on top of the saw teeth.

Referring now to FIGURE 7 grinding wheel 16 is a forty-five degree bevel-face wheel for sharpening the cutting teeth A and B of a combination circular saw blade 8. Now as an example in sharpening an eleven inch diameter combination circular saw blade 8 with two bevel teeth A and B and one raker tooth, set scale 9 on quadrant 3 to 0 so the top of slides 7 are horizontal and level with the center of grinding wheel 16. Set hook gauge on 10 degree scale to 11 for an eleven inch diameter saw blade. Place hook gauge on slides 7 with pointer 33 on the left hand side of 45 degree bevel face grinder 16. Move quadrant 3 so pointer 33 touches the left hand side of grinding wheel 16. Replace middle slide 7 with slide 7A saw blade 8 will lie at a 10 degree angle to provide a 10 degree bevel on face of cutting teeth A and B. Place saw blade 8 in holder 4 with teeth A and B pointing to the right at the top of the blade. Place saw blade 8 on slides 7 with holder 4 going in left hand track between middle slide 7A and left hand slide 7. Move saw blade 8 with set in teeth A pointing up toward grinding wheel 16 and against the left side of said grinding wheel 16. Then grind A tooth to the desired depth of cut for saw blade 8. Set stop 14 against holder 4 and tighten wing nut 13 on right bracket 11.

Then set stop 14 in the right hand track parallel or straight across from stop 14 in the left hand track and tighten wing nut 13 on left bracket 11. You are ready to grind a bevel on the face of tooth A and on the back of tooth B simultaneously. Place saw blade 8 on slides 7 with holder 4 going in the left hand track as in FIGURE 7 and rotate saw blade 8 to the left using both hands for perfect control of the blade, moving the blade in and out toward grinding wheel 16. You are grindiing a 10 degree bevel on the face of all teeth A with the set pointing up and at the same time grinding a 10 degree bevel on the back of teeth B.

To grind the other side of combination circular saw blade 8, the procedure is now repeated by turning saw blade 8 over in holder 4, turning grinding wheel 16 around on the grinding motor, reversing the hook gauge end for end on slides 7, using the right hand side of grinding wheel 16 and using the right hand track for holder 4 between middle slide 7A and right slide 7. You are now grinding a 10 degree bevel on the face of all teeth B. When completed, combination saw blade 8 has been correctly and accurately sharpened with a 10 degree hook on all cutting teeth, and a 10 degree bevel on the face of teeth A and B.

As an example in the use of notches 17 in slides 7, when rotating combination circular saw blade 8, notched slides 7 can be moved forward or backward so notches 17 in the top of slides 7 will clear the set in the saw teeth pointing down and saw blade 8 will turn freely.

The raker tooth on combination saw blade 8 is ground and sharpened in a similar manner as described for combination rip saw blade 8 in FIGURES 6 and 9 with no bevel on the tooth. Scale 9 is set to 0 and all three slides 7 are the same height so saw blade 8 will lie flat. A 20 degree or 30 degree hook on the face of the raker tooth is usual for such a combination saw blade.

In FIGURE 8 circular saw blade 8 is a dado saw with no set on the point of the saw teeth. To sharpen this particular circular saw blade, set scale 9 on quadrant 3 to approximately 10 degrees up so that quadrant 3 is pointing up at grinding wheel 16. All three slides 7 are in quadrant 3 and middle slide 7 is lined up with the middle of V-beveled grinding wheel 16. Place saw blade 8 in holder 4 with the raker teeth pointing to the right at the top of saw blade 8. Place saw blade 8 on slides 7 with holder 4 going in the right hand track between middle slide 7 and right slide 7. Move saw blade 8 up to grinding wheel 16 with group A teeth and grind one tooth for the correct and proper depth of cut. Set stop 14 against holder 4 and tighten wing nut 13 on bracket 11.

Set stop 14 in the left hand track parallel or straight across from stop 14 in the right hand track and tighten wing nut 13 on bracket 11. With stops 14 set in both tracks you are ready to grind, bevel and sharpen all of group A and B teeth on both sides of saw blade 8.

Again place saw blade 8 on slides 7 with holder 4 going in the right hand track as shown in FIGURE 8. Rotate saw blade 8 to the left with both hands for perfect control of the blade and grind all teeth in group A.

To grind group B teeth, the exact procedure is repeated by turning saw blade 8 over in holder 4 and placing holder 4 in the left hand track on quadrant 3 between middle slide 7 and left slide 7.

Grind and sharpen raker teeth as described for the combination saw blade and the combination rip saw blade in FIGURES 6 and 9.

From the foregoing, it will be readily apparent that there has been devised an apparatus for jointing, gumming and shaping a circular saw blade during sharpening of said saw blade which provides for accurate, precise, and correct jointing, gumming and shaping of the point, gullet and face of the saw teeth of a circular saw blade. From this explanation the construction and operation of the apparatus will be readily understood and further explanation is believed to be unnecessary. However, since numerous modifications and changes will occur to those skilled in the art, it is not desired to limit the invention to the exact construction shown and described and accordingly all suitable modifications and equivalents may be resorted to within the scope of the appended claims.

The size of circular saw blades on which the saw teeth may be jointed, gummed and shaped by the apparatus of this invention may vary from about four inches in diameter to about twenty-four inches in diameter.

The apparatus may be easily adjusted for any hook or bevel of the saw teeth which is desired for the particular purpose for which the circular saw blade is designed.

The hook is determined by the angle between a line parallel with the face of the saw tooth and the line from the gullet of the saw tooth to the center of the circular saw blade. This angle may be from 0 degrees to about 30 degrees, and is principally for cross-cut and combination saw blades. The hook is determined on the apparatus of the present invention by the hook gauge and is shown in detail in FIGURE 5.

The bevel of the face of each saw tooth is measured by the amount of angle that the circular saw blade is tilted around the axis parallel to the diameter of the grinding wheel as the face of each saw tooth is ground. This is determined on the apparatus of the present invention by replacing middle slide 7 with a slide which is higher than slides 7 on either side and the predetermined height determines the angle at which the saw blade will rest when it is in contact with middle slide 7A and one of the other slides 7 on either side. The angle of bevel of the saw teeth on any circular saw blade may vary from 0 degrees to about 25 degrees but preferably is from 0 degrees to no more than 15 degrees for nearly all purposes.

The bevel on the point of the saw teeth of a circular saw blade is the angle at which the point is jointed, or in other terminology, the angle with the horizontal at which the point of the teeth of a circular saw blade approaches the edge of the grinding wheel. This angle is determined on the apparatus of the present invention by vertical angle scale 9 and may vary from 0 degrees to 15 degrees positively or negatively with the diameter of the grinding wheel. Preferably, however, the amount of bevel of the point of the teeth of a circular saw blade will vary by the thickness of saw blade from about 0 degrees to about 10 degrees.

Some of the unique and unusual advantages of the apparatus of the present invention are (1) the operator has both hands on the saw at all times for perfect control, (2) the saw blade can be picked up and examined frequently to determine if the grinding has been done properly without going to the difficulty of dismantling the apparatus, and (3) both sides of the saw blade can be sharpened and beveled at the point without moving the apparatus from the position in which it has been fixed, by merely turning the saw blade over and reclamping it in the holder. In addition to the above advantages, it should be noted that slides 7 in quadrant 3 have notches 17 approximately one-eighth inch deep and approximately one-half to one inch long to clear the set in the saw teeth when rotating the saw. This eliminates any catch or interference with the grinding work being performed at that particular moment. Furthermore, any of the three slides can be moved either forward or backward to any position and can be turned end for end if desired.

One of the most unique and important features of the apparatus of the present invention is the holder or clamp for the circular saw blade which is shown in detail in FIGURE 10. The holder is designed to fit between the slides on the quadrant with no possibility of grinding the wrong part of the saw blade because the saw blade slipped sideways. With the foolproof features of this invention, all beveling of the face of each saw tooth, the beveling of the point of the teeth of the circular saw blade, the depth of grinding the gullet of each saw tooth and the angle of hook of each saw tooth are always precisely and exactly the same so as to produce a finished product which is as perfect as if done on an automatic machine at a factory installation.

The hook gauge is very important to quickly and accurately determine the setting required for the desired hook of the teeth of a circular saw blade. In addition, the hook gauge when turned end for end results in the exact same hook angle on all teeth although alternate teeth are ground with opposite bevel.

What is claimed is:

1. An apparatus for jointing, gumming and shaping the saw teeth of a circular saw blade which comprises in combination a portable slide base slidably connected to a supporting structure which has mounted thereon a power driven grinding wheel adjacent to said portable slide base; a quadrant base means rotatably connected to said slide base to provide movement around a horizontal axis perpendicular to the diameter of said grinding wheel; holding means for said circular saw blade independent of said quadrant base; means on said quadrant base for manually guiding said circular saw blade and said holding means towards said grinding wheel; means for stopping said circular saw blade fastened to said holding means as it is manually moved toward said grinding wheel; means for setting the vertical angle of said circular saw blade in a vertical plane perpendicular to the diameter of said grinding wheel; means for setting the vertical angle of said circular saw blade in a vertical plane parallel to the diameter of said grinding wheel; and means for setting the horizontal angle at which the face of said saw teeth of said circular saw blade are disposed with the diameter of said circular saw blade.

2. The apparatus of claim 1 wherein said means on said quadrant base for manually guiding said circular saw blade and said holding means toward said grinding wheel is comprised of at least three parallel dividers having the top surfaces thereof horizontal and providing at least two tracks in which said holding means can slide forward and backward only toward said grinding wheel.

3. The apparatus of claim 2 wherein said holding means is comprised of a circular button with an elongated shaft extending outwards perpendicular to the principal plane of said button and a clamping means to hold said circular saw blade on said shaft and against said button, said button being sized to fit in said tracks on said quadrant between said parallel dividers so that there is no sideward movement.

4. The apparatus of claim 2 wherein said means for setting the horizontal angle at which the face of said saw teeth of said circular saw blade are disposed with the diameter of said circular saw blade is comprised of a gauge means fitted on said dividers on said quadrant, said gauge means being set to determine the position of said quadrant in relation to said grinding wheel for each size of said circular saw blade.

5. The apparatus of claim 2 wherein said means for setting the vertical angle of said circular saw blade in a vertical plane perpendicular to the diameter of said grinding wheel is comprised of a middle divider of said dividers on said quadrant having its top horizontal surface parallel but higher than the top horizontal surface of said other dividers so that said vertical angle from the top of said middle divider to the top of one of the other of said dividers is the desired vertical angle of said circular saw blade in a vertical plane perpendicular to the diameter of said grinding wheel.

References Cited

UNITED STATES PATENTS

| | | | |
|---|---|---|---|
| 264,021 | 9/1882 | Agan | 76—43 |
| 2,720,798 | 10/1955 | Hedlund | 76—43 |
| 3,000,236 | 9/1961 | Lindheim | 76—43 |

BERNARD STICKNEY, *Primary Examiner.*